United States Patent
Voelz et al.

(10) Patent No.: US 11,304,384 B2
(45) Date of Patent: Apr. 19, 2022

(54) INTEGRATED HORTICULTURAL GROW RACK KIT

(71) Applicant: Borroughs, LLC, Kalamazoo, MI (US)

(72) Inventors: Dale W. Voelz, Portage, MI (US); Adam J. Thomas, Kalamazoo, MI (US)

(73) Assignee: Borroughs, LLC, Kalamazoo, MI (US)

( * ) Notice: Subject to any disclaimer, the term of this patent is extended or adjusted under 35 U.S.C. 154(b) by 112 days.

(21) Appl. No.: 16/916,638

(22) Filed: Jun. 30, 2020

(65) Prior Publication Data

US 2021/0000024 A1 Jan. 7, 2021

Related U.S. Application Data

(60) Provisional application No. 62/869,070, filed on Jul. 1, 2019.

(51) Int. Cl.
*A01G 9/16* (2006.01)
*A01G 9/20* (2006.01)
(Continued)

(52) U.S. Cl.
CPC .............. *A01G 9/16* (2013.01); *A01G 7/045* (2013.01); *A01G 9/20* (2013.01); *A01G 9/22* (2013.01); *A01G 9/24* (2013.01); *A01G 9/249* (2019.05)

(58) Field of Classification Search
CPC ............. A01G 9/249; A01G 9/16; A01G 9/20
See application file for complete search history.

(56) References Cited

U.S. PATENT DOCUMENTS

| 1,943,074 A | 1/1934 | Heyman |
| 2,300,776 A * | 11/1942 | Collins ................. A01G 9/16 47/69 |

(Continued)

FOREIGN PATENT DOCUMENTS

| CN | 103054346 A | 4/2013 |
| CN | 108496783 A | 9/2018 |

(Continued)

OTHER PUBLICATIONS

International Search Report and Written Opinion of the International Searching Authority from corresponding Patent Cooperation Treaty (PCT) Application No. PCT/IB2020/056197, indicated completed on Sep. 30, 2020.

*Primary Examiner* — Monica L Barlow
(74) *Attorney, Agent, or Firm* — Gardner, Linn, Burkhart & Ondersma LLP

(57) ABSTRACT

A horticultural plant growing assembly includes a pair of casings, each with a bottom and a side wall. Each side wall includes an upper edge configured to engage one another to define a cavity between the casings. The plant growing assembly further includes a light system, and a plurality of frame members that are connectable together to form a frame, with the light system being attachable to the frame. The plant growing assembly is configurable into a packaged configuration and an assembled configuration. In the packaged configuration, the frame members and the light system are contained within the cavity, and in the assembled configuration the frame members are connected together to form the frame with the light system attached to the frame. One of the casings includes a shelf adapted to support a plant with the light system disposed above the shelf.

20 Claims, 13 Drawing Sheets

(51) Int. Cl.
    *A01G 9/24*     (2006.01)
    *A01G 7/04*     (2006.01)
    *A01G 9/22*     (2006.01)

(56) References Cited

U.S. PATENT DOCUMENTS

| | | | |
|---|---|---|---|
| 2,709,838 A * | 6/1955 | Zausner | A01G 9/16 47/17 |
| 5,141,149 A | 8/1992 | Fulton | |
| 5,946,853 A * | 9/1999 | Jacobs | A01G 9/16 47/60 |
| 6,173,847 B1 | 1/2001 | Zellner, III et al. | |
| 6,725,598 B2 * | 4/2004 | Yoneda | A01G 9/246 47/60 |
| 7,654,036 B2 | 2/2010 | Shouse et al. | |
| 10,219,446 B2 | 3/2019 | Parquette | |
| 11,044,973 B1 * | 6/2021 | Easterwood | A47C 27/081 |
| 2005/0034367 A1 * | 2/2005 | Morrow | A01G 9/16 47/65.5 |
| 2010/0107489 A1 | 5/2010 | Silver | |
| 2010/0282745 A1 * | 11/2010 | Sauermann | A01G 9/16 220/4.03 |
| 2012/0137581 A1 | 6/2012 | Teasdale | |
| 2013/0256072 A1 * | 10/2013 | Farhat | A47C 4/52 190/2 |
| 2014/0109474 A1 | 4/2014 | Reed, Jr. | |
| 2016/0360712 A1 | 12/2016 | Yorio et al. | |
| 2017/0094914 A1 * | 4/2017 | Paquette | F21V 11/186 |
| 2018/0352755 A1 | 12/2018 | Szoradi et al. | |
| 2019/0327911 A1 * | 10/2019 | Montagano | A01G 9/16 |

FOREIGN PATENT DOCUMENTS

| | | | | |
|---|---|---|---|---|
| DE | 2841368 A1 * | 3/1980 | | A01G 9/16 |
| FR | 2390897 A1 | 12/1978 | | |
| GB | 191106082 A * | 12/1911 | | A01G 9/16 |
| KR | 101068268 B1 | 9/2011 | | |

* cited by examiner

INTEGRATED HORTICULTURAL GROW RACK KIT

CROSS REFERENCE TO RELATED APPLICATION

This application claims priority to U.S. Provisional Patent App. Ser. No. 62/869,070, filed Jul. 1, 2019, which is hereby incorporated herein by reference in its entirety.

BACKGROUND AND FIELD OF THE INVENTION

The present invention is directed to a compact plant growing assembly kit, and in particular to a plant growing assembly including frame members, top and base caps, and lights, where the assembly may be integrally packaged within the top and base caps for transport and sale.

Horticulture is known as the science and art of the development and sustainable production of cultivated plants. Horticultural crops are diverse and can include all manner of plants. Indoor growing of plants is a popular activity and various equipment is available to consumers for promoting growing, including various lighting, watering and shelf systems. For example, U.S. Pat. No. 7,654,036 B2 to Best Coast Growers discloses a tubular grow rack that can be assembled in many different sizes, is collapsible, and can support hanging objects.

SUMMARY OF THE INVENTION

The present invention provides a cost-effective, pre-engineered, free-standing, all-in-one horticultural plant growing assembly that is configurable into a packaged orientation for convenient storage and shipment, and an assembled orientation in which plants may be disposed on a shelf with a light positioned above the plants. The plant growing assembly of the present invention further eliminates the need to spend hours researching, purchasing, and assembling multiple equipment options to effectively grow a multitude of plants, such as cannabis, tomatoes, lettuce, decorative indoor plants, etc. Additionally, the assembled configuration of the plant growing assembly of the present invention is aesthetically designed for use in any residential space.

According to one form of the present invention, a horticultural plant growing assembly includes a pair of casings, with each casing having a bottom and a side wall defining a perimeter of each casing. Each side wall of each casing includes an upper edge with a flange. The flanges of the casings are correspondingly shaped to be engaged together to define a cavity between the bottoms of the casings. The plant growing assembly further includes a light system with lights for projecting light, and a plurality of frame members, with the frame members being connectable together to form a frame. The light system is selectively attachable to the frame. The plant growing assembly is selectively configurable into a packaged configuration and an assembled configuration. In the packaged configuration, the frame members and the light system are contained within the cavity when the flanges of the casings are engaged together. In the assembled configuration, the frame members are connected together to form the frame with the light system attached to the frame, and with the frame engaged with and extending upward from at least one of the casings whereby the at least one of the casings has a shelf configured to support a plant with the light system being disposed above the shelf.

According to an aspect, the light system includes a light driver assembly and a plurality of light panels configured to be assembled to form a light fixture. The light driver assembly and the light fixture are configured to be selectively attachable to the frame, and the light driver assembly and the plurality of panels are contained within the cavity in the packaged configuration.

According to another aspect, each of the plurality of light panels is selectively connectable to the light driver assembly to receive electrical power therefrom. An underside of each light panel includes an array of LED lights, and an upside of each light panel includes heat sinks.

According to yet another aspect, the light driver assembly includes a pair of light intensity switches. One of the pair of light intensity switches is configured to selectively adjust intensity of red spectrum light and another one of the pair of light intensity switches is configured to selectively adjust intensity of white/blue spectrum light.

According to a further aspect, the horticultural plant growing assembly further includes a pair of fan assemblies, each of the fan assemblies including a carbonated filter. The pair of fan assemblies is configured to be selectively attachable to the frame, and the pair of fan assemblies is contained within the cavity in the packaged configuration.

According to yet a further aspect, each of the pair of fan assemblies is connectable to the light driver assembly to receive electrical power therefrom.

According to still another aspect, the light fixture is adjustably mountable to the frame whereby distance between the light fixture and the shelf is selectively vertically adjustable.

The plant growing assembly kit provides a system that is collapsible into a convenient orientation for transport and sale with no shipping waste, and when assembled is useable in various configurations for growing plants, where all manner of plants may be grown using the invention. The kit thus provides a pre-engineered, all-in-one horticultural grow product for growing plants that includes everything, less the seedlings, containers and dirt, to grow plants indoors that is an all-in-one solution. These and other objects, advantages, purposes and features of this invention will become apparent upon review of the following specification in conjunction with the drawings. The invention thus provides a self-contained, pre-packaged, modularized rack and shelf system for growing plants indoors. Its components are designed to be convertible to various rack styles and provides adjustable lighting variations to support the expedited growth of a wide variety of plants. The product is all-inclusive providing most grow components, step-by-step grow recipes, and is designed to minimize shipping waste.

DETAILED DESCRIPTION OF PREFERRED EMBODIMENTS

Figure 1:
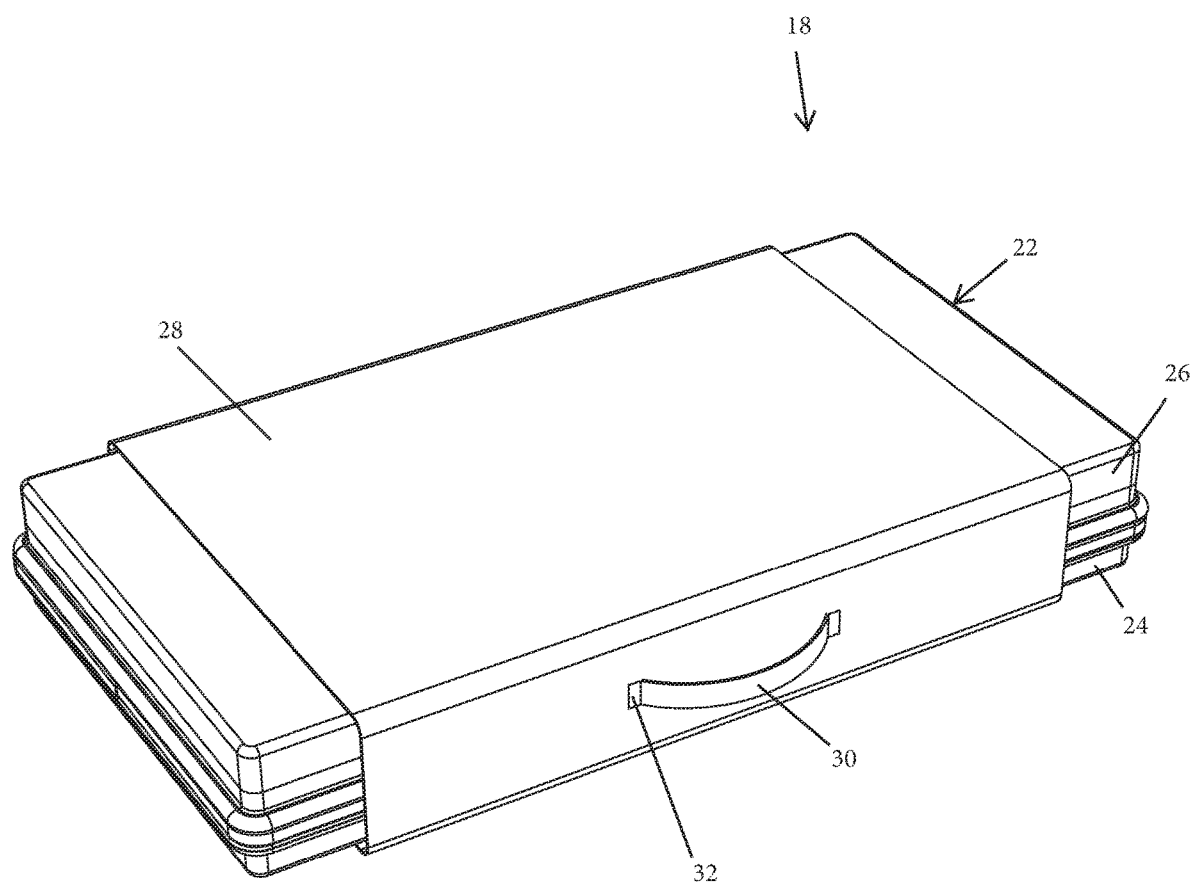
FIG. 1 is a perspective view of a plant growing assembly kit in accordance with the present invention shown in a disassembled and packaged orientation for transport and sale.
Figure 11:
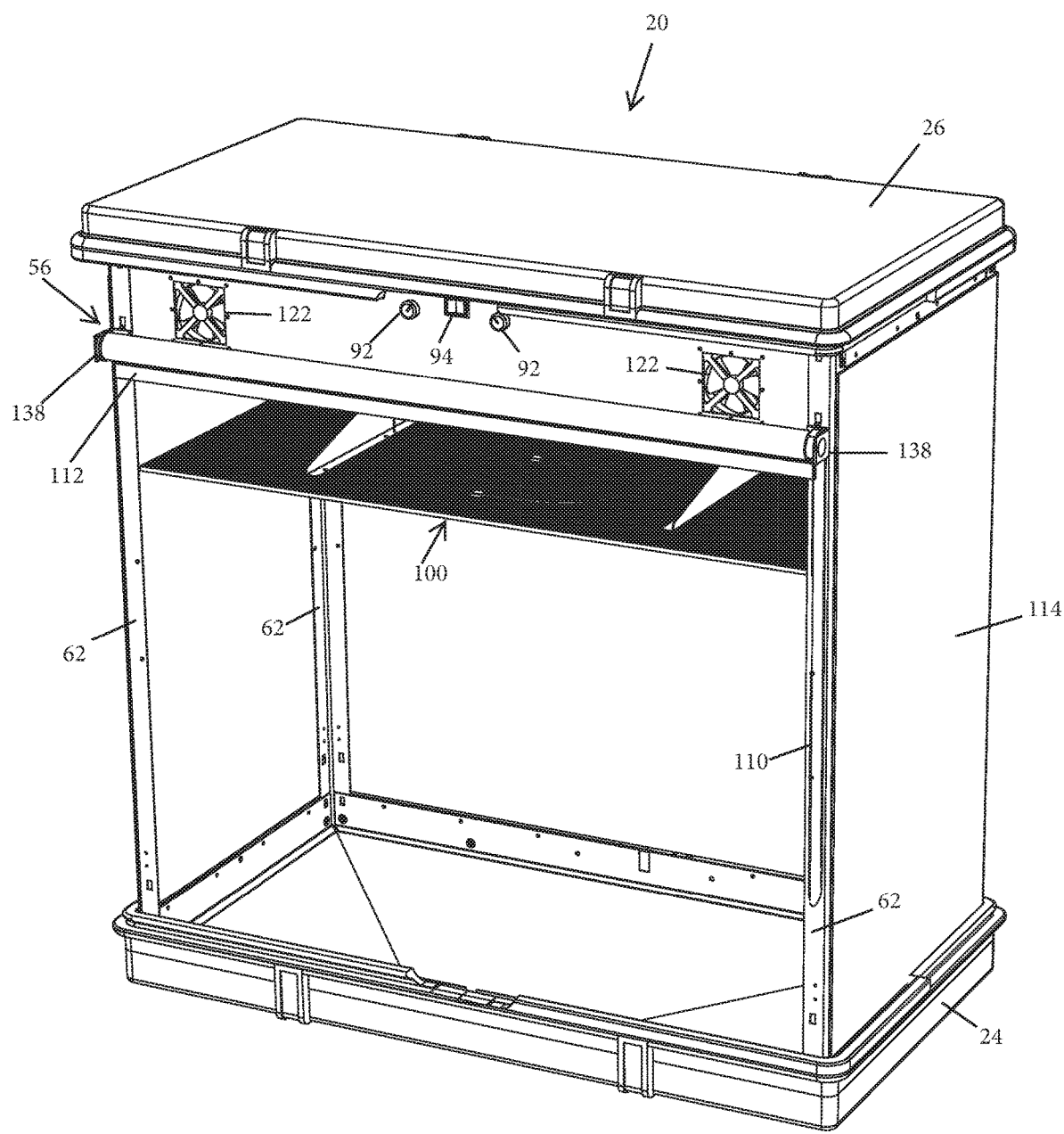
FIG. 11 is a perspective view of the sub-assembly of FIG. 10 shown with the front reflective shade, fixed reflective panel and a top cap mounted onto the frame assembly to form a plant growing assembly in accordance with an embodiment of the present invention.
Figure 12:
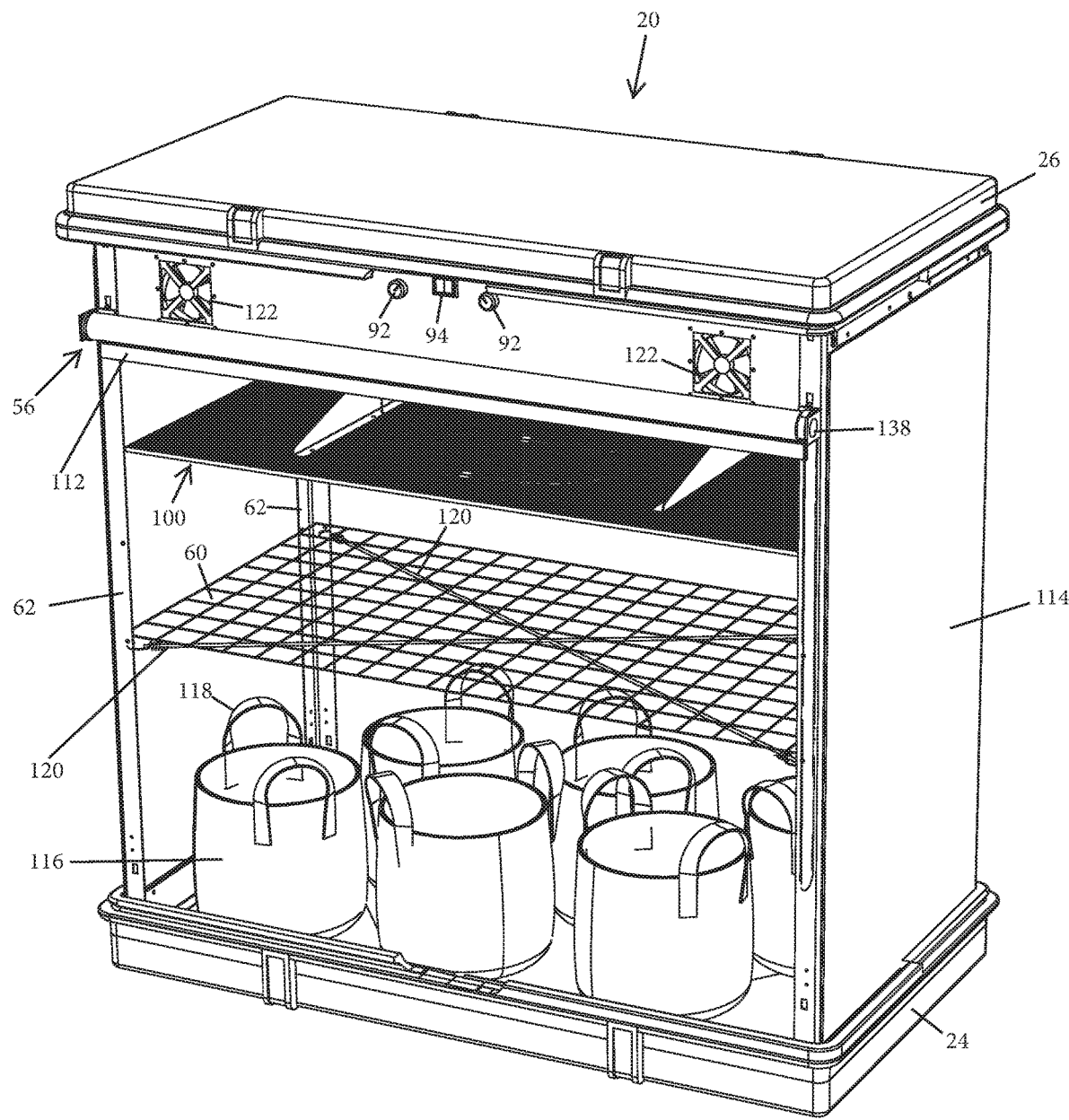
FIG. 12 is a perspective view of the plant growing assembly of FIG. 11, shown with a screen installed and a plurality of grow bags placed on the plant growing assembly.

The present invention will now be described with reference to the accompanying figures, wherein the numbered elements in the following written description correspond to like-numbered elements in the figures. A plant growing assembly or grow rack kit 18 in a packaged orientation for storage, transport and/or sale is illustrated in FIG. 1. The plant growing assembly kit 18 is used to construct a plant growing assembly 20, such as shown in FIGS. 11 and 12. In the illustrated embodiment of FIG. 1, the plant growing assembly kit 18 is formed in the packaged orientation by way of a packaging case 22 formed by a base or bottom member or pan or shelf 24 and a top member or top cap 26 with an outer wrapper 28 applied there over. The wrapper 28 includes an integrated carrying handle 30 for ease of lifting that projects through an opening 32 in the wrapper 28 when disposed about the bottom shelf 24 and top cap 26. Of note, when in the packaged orientation of FIG. 1, the bottom shelf 24 and top cap 26 form a clam shell arrangement with additional disassembled components for constructing the assembly 20 contained in the cavity 34 (FIG. 2) formed between the bottom shelf 24 and top cap 26, including frame components, LED lights, a rack, and growing containers for plants, as well as other accessories. The plant growing assembly 20 is thus conveniently packaged when in the orientation of FIG. 1, such as for store display and transport, including for shipping and for a user to transport the kit 18 from a store to a point of use, such as the residence of the purchaser. Moreover, in the illustrated embodiment the kit 18 includes all of the equipment needed for a user to grow plants via assembly 20 with the exception of dirt and seeds, thus providing a self-contained, portable and easy to assemble and use system for growing plants.

Figure 2:
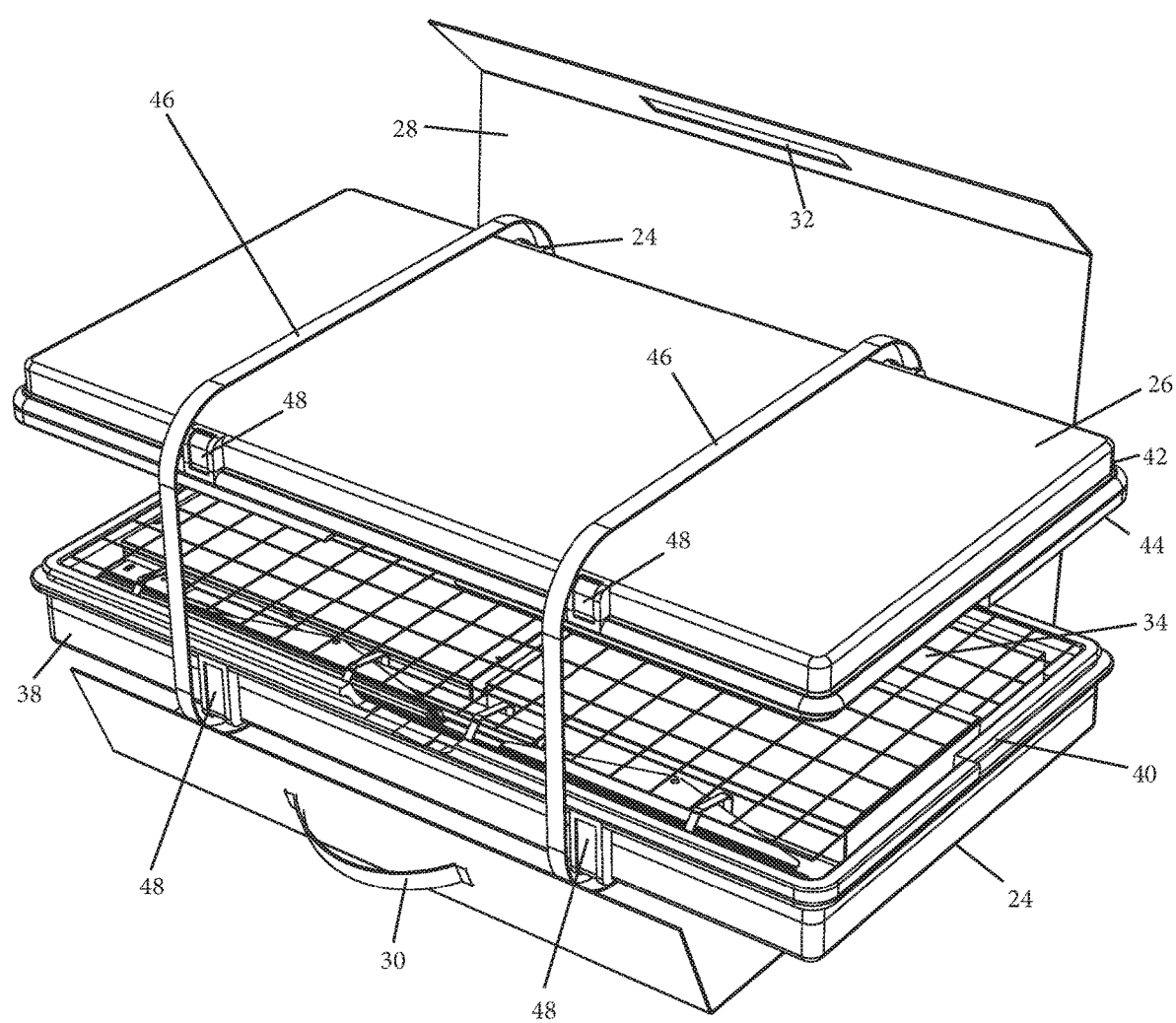
FIG. 2 is an exploded perspective view of the plant growing assembly kit of FIG. 1 shown in a partially opened orientation.
Figure 3:
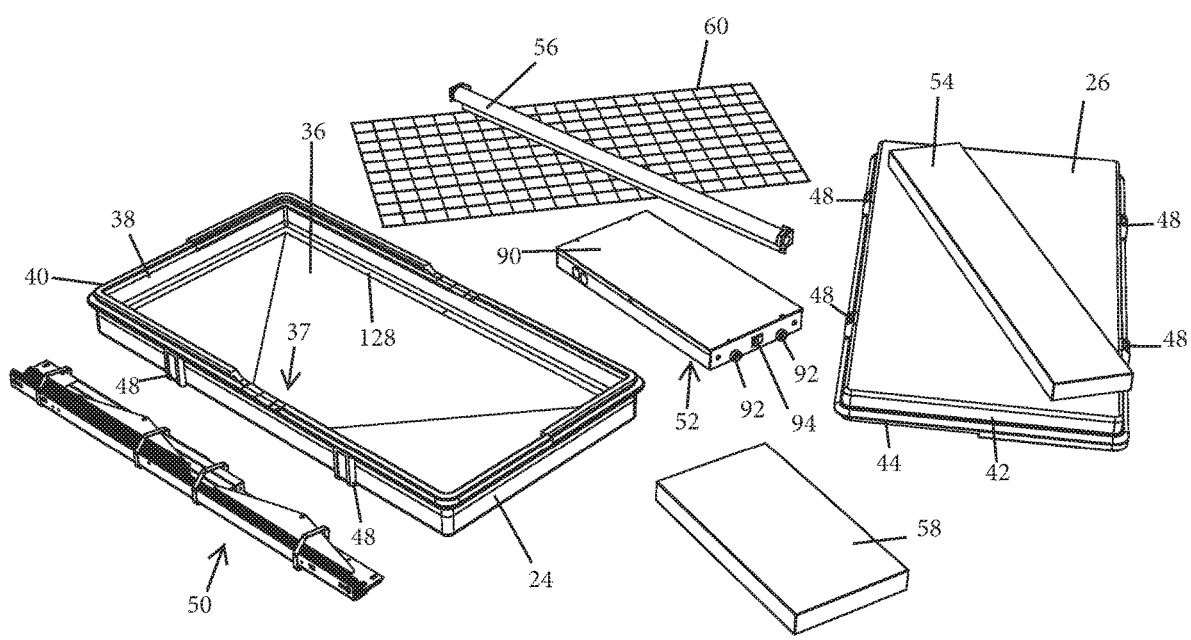
FIG. 3 is a perspective view of pre-packaged components of the plant growing assembly kit of FIG. 1 shown removed from the bottom shelf and top cap upon opening.

With further reference to FIGS. 2 and 3, the base shelf 24 has a tray-like configuration with a bottom 36 surrounded by an upright side wall 38 extending from the bottom 36, thereby forming a cavity. The upright side wall 38 of the base shelf 24 defines an upper or outer edge 40 about the perimeter of the base shelf 24. Similarly, the top cap 26 includes an internal bottom, an upright side wall 42 extending from the bottom, with the upright side wall 42 of the top cap 26 defining an upper or outer edge 44 about the perimeter of the top cap 26. In the illustrated embodiment of FIG. 2, the upper edges 40 and 44 include correspondingly shaped perimeter flanges that create an interference fit or tongue-and-groove connection between the base shelf 24 and top cap 26 whenever they are connected together to form the packaging case 22. In other words, whenever the members 24 and 26 are engaged or connected together, their respective perimeter flanges enclose or seal the perimeters of the two members 24 and 26 together in a clam shell arrangement to form the enclosed cavity 34 within which other components of the assembly 20 may be stored in a disassembled orientation. The base shelf 24 and top cap 26 thus form casings for the packaging case 22 in the packaged orientation of FIG. 1.

Both the base shelf 24 and top cap 26 are symmetrical and shaped as rectangles in the illustrated embodiment, though other shapes are also possible. The interior surface or bottom 36 of the base shelf 24 is tapered from its four corners towards an interior front-middle region 37 of the base shelf 24 so that water accumulated in the interior surface or on the bottom 36 is directed for collection to a low point. The interior front-middle region 37 of the base shelf 24 may also include a drain opening (not shown) to drain the water out of the interior of the base shelf 24. Alternatively, water may be removed via a syringe.

In the illustrated embodiment the base shelf 24 and top cap 26 are molded from Expanded Polypropylene (EPP) material. In the packaged orientation of FIG. 1, the base shelf 24 and top cap 26 may additionally be secured together by a pair of nylon straps 46 wrapped around the two members 24, 26 when they are engaged together, for which purpose each of the base shelf 24 and top cap 26 include pairs of retention grooves 48 disposed on opposed sides, with the grooves 48 being molded into the members 24, 26. The retention grooves 48 assist in ensuring that straps 46 remain in place about members 24, 26. The retention grooves 48 may additionally provide reinforcement for the securing with straps 46. Although members 24, 26 in the illustrated embodiment are constructed of EPP, which provides excellent energy absorption, high strength properties, superior durability, lightweight, resistance to water, chemicals, and most oils, and is recyclable, it should be appreciated that other suitable plastic materials may be used, as well as alternative materials. The base shelf 24 and top cap 26 may be constructed to be identical with the flanges of their top edges 40, 44 configured to mate together, such as when rotated 180 degrees with respect to each other.

With further reference to FIGS. 1 and 2, the wrapper 28 may be constructed of cardboard with the overlapping end flaps that include the handle 30 and opening 32 being glued in place in the packaged orientation of FIG. 1. Optionally, the outer wrapper 28 may include exterior product graphics and/or detailed growing instructions for specific plants or assembly and use instructions may be pre-printed on the underside of the outer wrapper 28.

As understood from FIG. 2, when the plant growing assembly kit 10 is in the packaged orientation, the hollow cavity 34 of the packaging case 22 is configured to retain in pre-determined positions various pre-packaged hardware components and accessories of the plant growing assembly kit 18, which will be discussed in more detail below.

Turning now to FIG. 3, the hardware components of the plant growing assembly kit 18 include a pre-packaged frame component bundle 50, a light system comprising a LED driver 52 and a set of light panels packaged in a light panels box 54, a rolled-up front reflective shade 56, a set various accessories packaged in an accessories box 58, and a scrog screen 60. It will be understood that the base shelf 24 and top cap 26 are also part of the hardware components of the plant growing assembly kit 18 and are used to construct the plant growing assembly 20, as will be described below.

Figure 4:
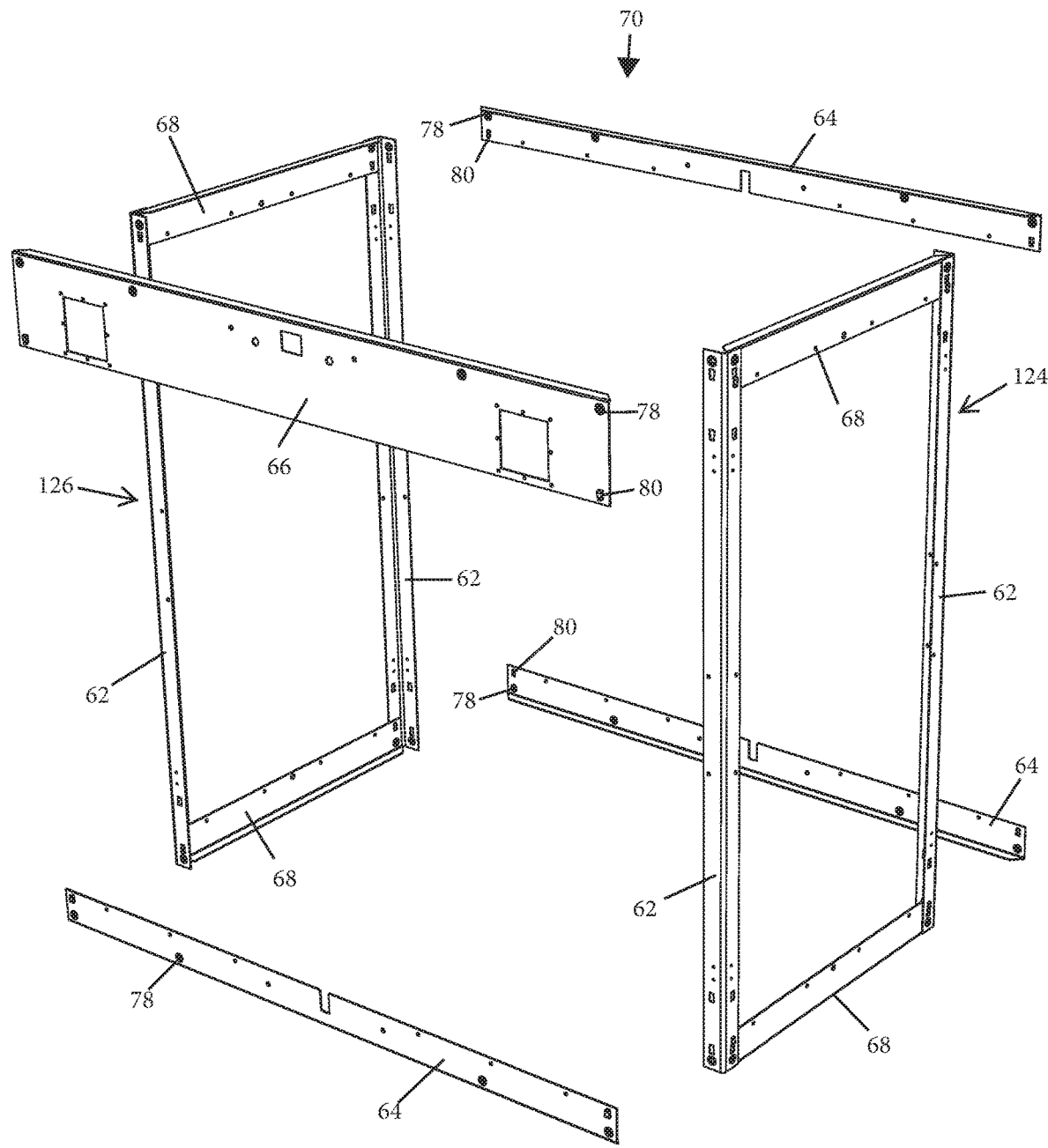
FIG. 4 is an exploded perspective view of frame components of the frame assembly of the plant growing assembly kit of FIG. 1.
Figure 7:
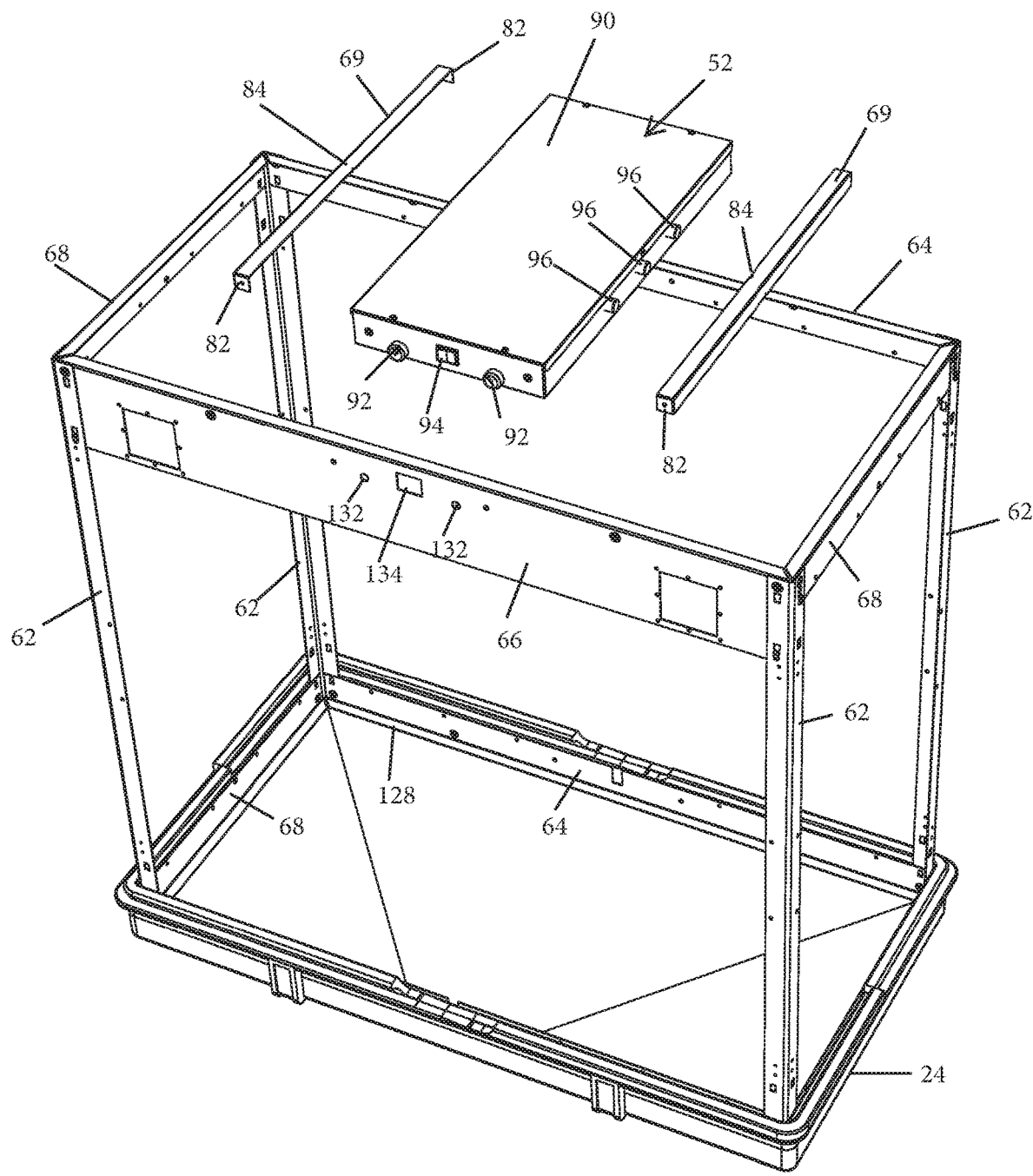
FIG. 7 is a partial exploded top perspective view of the frame assembly of FIG. 6 shown with a pair of upper cross members and a LED driver prior to mounting to the frame assembly.
Figure 9A:
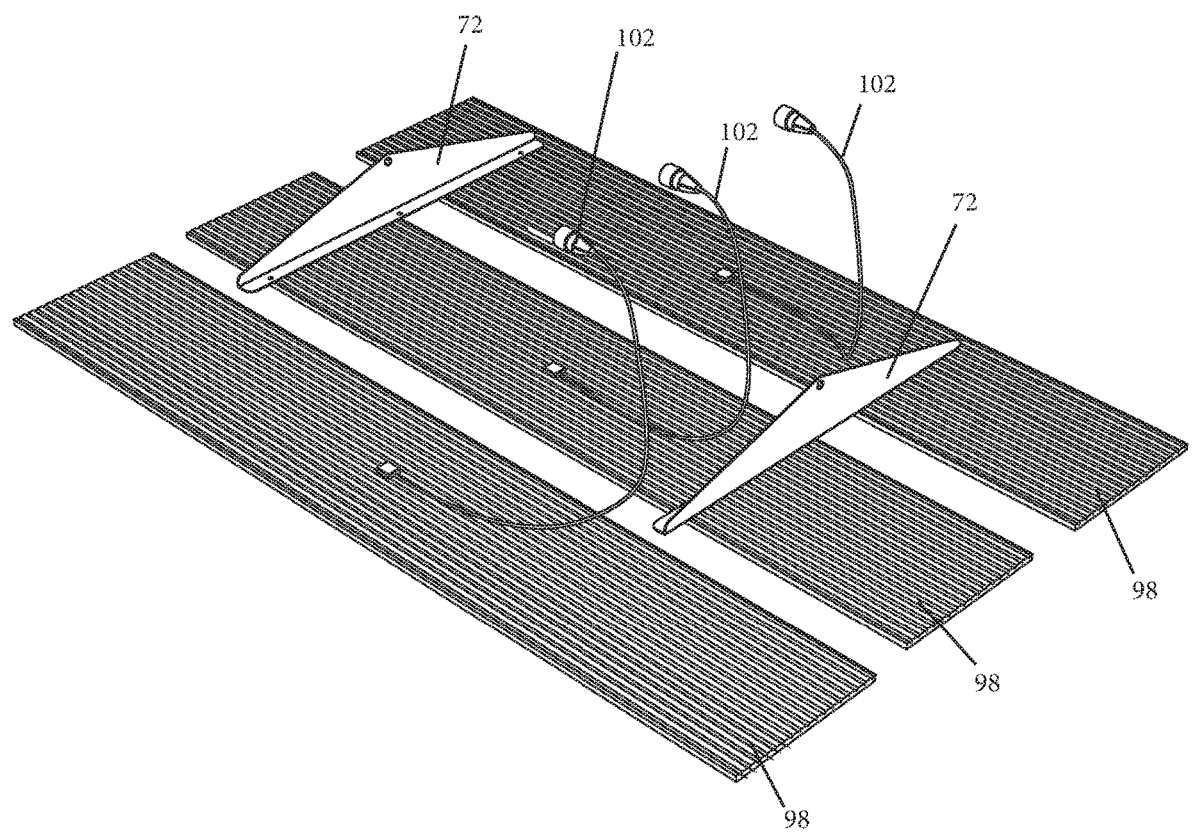
FIG. 9A is an exploded perspective view of LED light panels of a light system in accordance with an aspect of the present invention shown with hanger brackets for mounting the LED light panels.
Figure 9B:
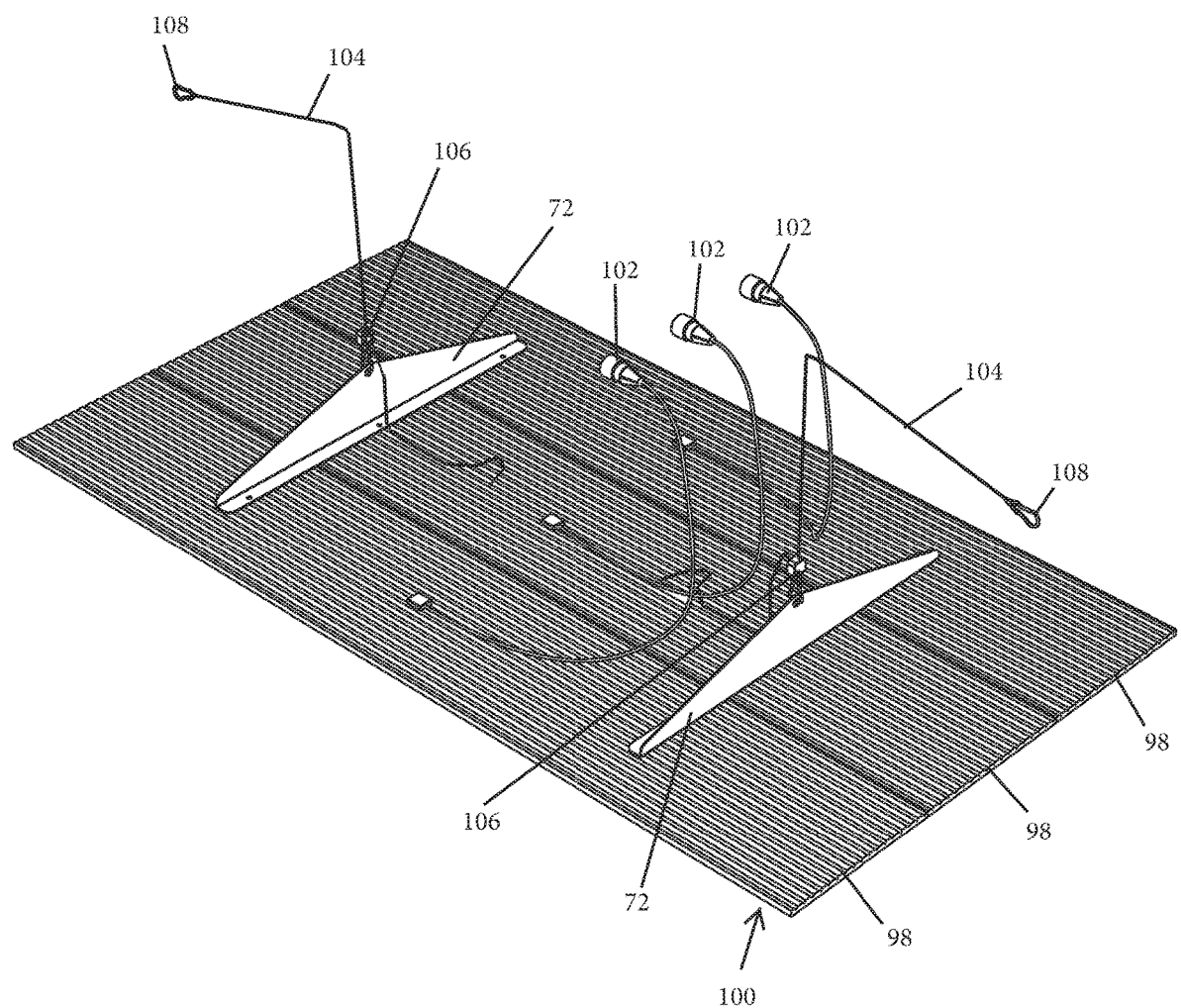
FIG. 9B is a perspective view of the interconnected LED light panels and hanger brackets of FIG. 9A shown with an adjustable suspension system for mounting the LED light panels to the frame assembly.

In the illustrated embodiment the frame component bundle 50 includes the following frame members or components: four vertical posts 62, three face beams 64, one front fan mount 66, and four side or end beams 68, such as shown in FIG. 4, and two upper cross bars 69, as shown in FIG. 7. It will be understood that the frame members included in the frame component bundle 50 form a frame or frame assembly 70 of the plant growing assembly 20. It is contemplated that each of the frame members is stamped out of cold-rolled steel, such as 16-gauge steel, such that the frame assembly 70 of the plant growing assembly 20 provides for a rigid structure. It is further contemplated that all steel components of the frame assembly 70 may be treated for rust resistance, including being powder coated. Alternatively, the frame components may be constructed of aluminum, plastic or another material. In addition to the above noted frame members, the frame component bundle 50 also includes two light support brackets 72, as shown in FIGS. 9A and 9B and discussed in more detail below.

Each vertical post 62 has an L-shaped cross-section and is formed as a symmetrical and elongate angle with a pair of equal flanges. Each vertical post 62 includes a plurality of stamped holes 74 and tapered slots 76, such as shown for example in FIGS. 5A and 5B, disposed on each flange and at both ends of each vertical post 62 for engagement with front fan mount 66, face beams 64 and side beams 68. Each vertical post 62 also includes apertures at specific locations along the length that are used for attaching other components and accessories to each vertical post 62, as discussed further below.

Each face beam 64 is formed as an elongate angle with unequal flanges and having the length approximately equal to the length of each vertical post 62. As shown in FIG. 4, each face beam 64 includes stamped holes 78 and tabs 80 disposed at opposed ends for engagement with respective vertical posts 62. Each face beam 64 also includes a plurality of holes at specific locations along the length that are used for attaching other components and accessories to each face beam 64, as discussed further below. The front fan mount 66 is formed as an elongate angle with unequal flanges, where a significantly wider flange of the front fan mount 66 forms a panel that defines various holes, openings and apertures that are used for attaching other hardware components and accessories to the front fan mount 66, as discussed further below. The length of the front fan mount 66 is equal to the length of each face beam 64. The front fan mount 66 includes stamped holes 78 and tabs 80 disposed at opposed ends in like manner to face beams 64 for engagement with respective vertical posts 62.

Figure 5A:
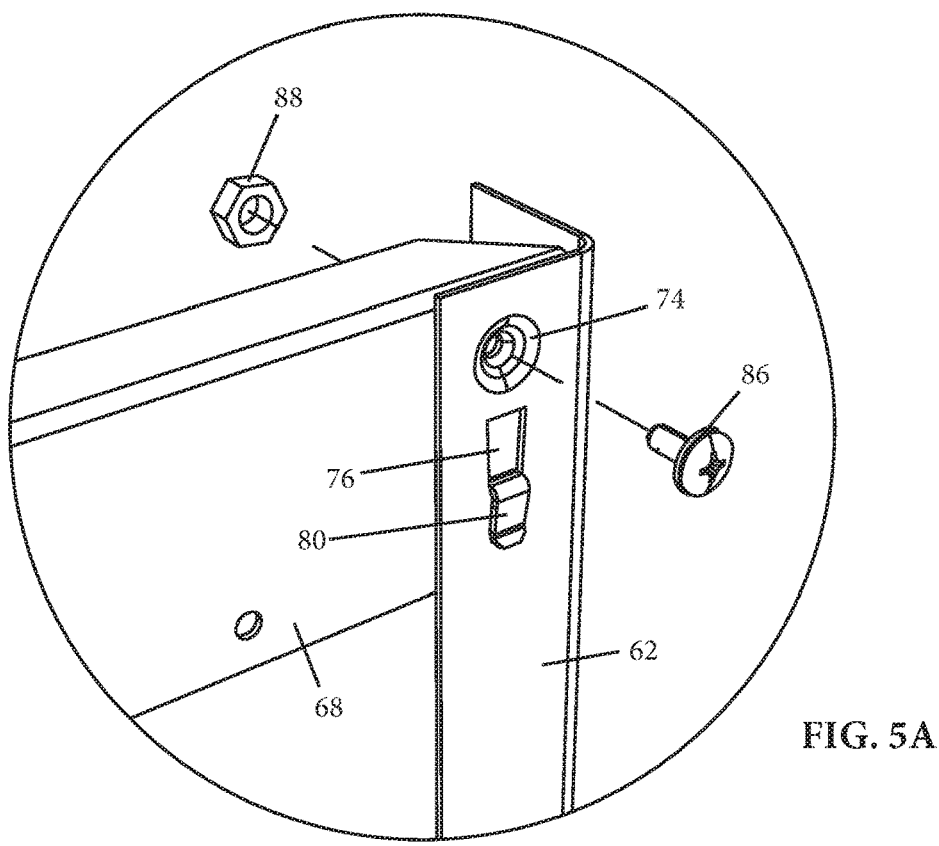
FIGS. 5A and 5B are close-up perspective assembly views of a selected corner of the frame assembly of FIG. 4.
Figure 5B:
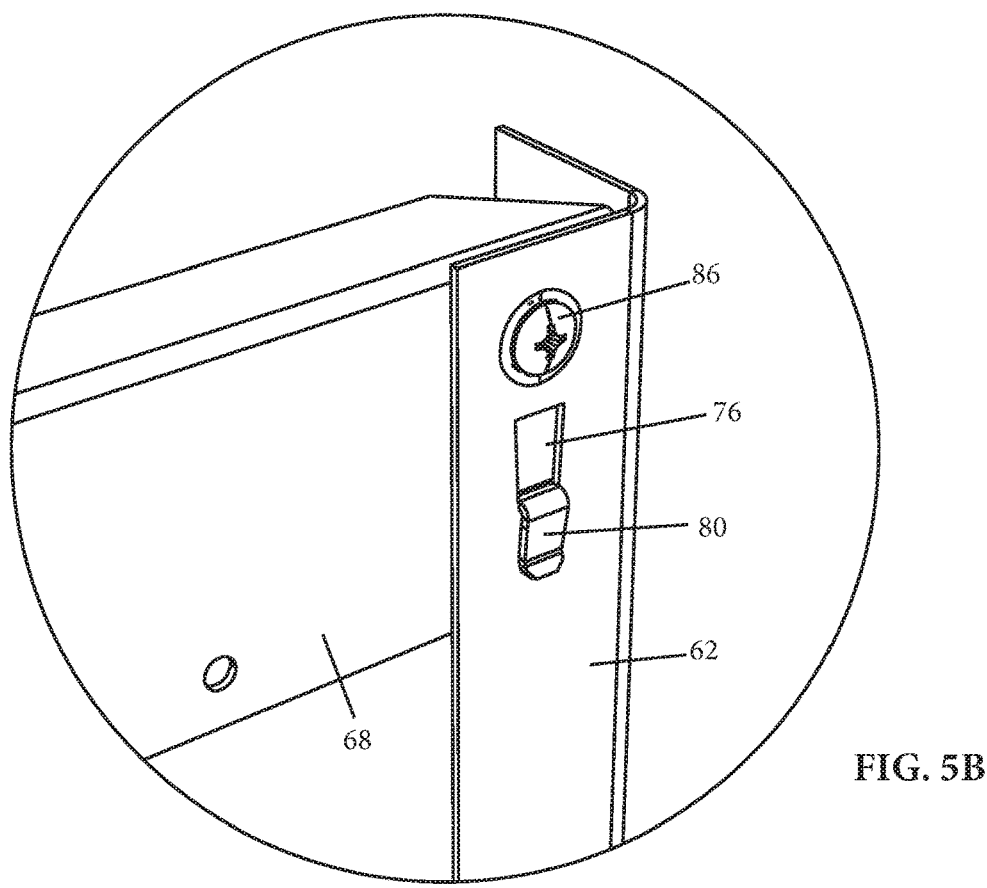

Each side beam 68 is formed as an elongate angle with unequal flanges and having the length of approximately half of the length of each face beam 64. Each side beam 68 includes stamped holes 78 and tabs 80 disposed at opposed ends for engagement with respective vertical posts 62 (FIGS. 5A and 5B). Each side beam 68 also includes a plurality of holes at specific locations along the length that are used for attaching other components and accessories to each side beam 68, as discussed further below.

Each upper cross bar 69 is formed as a symmetrical and elongate L-shaped angle with a pair of equal flanges and having a length approximately equal to the length of each side beam 68. Each upper cross bar 69 also includes a pair of ends 82 (FIG. 7) with each end 82 including a hole used for attachment of each upper cross bar 69 to a respective face beam 64 and front fan mount 66. Each upper cross bar 69 also includes a notch 84 (FIGS. 7 and 8) disposed generally at the center of each upper cross bar 69 that is used as a locator and a retaining groove for hanging and supporting the LED lights, as discussed further below.

FIGS. 4-8 illustrate the interconnection of the frame members to form the frame 70, and additionally illustrate the engagement of the frame 70 with the bottom shelf 24 as part of the assembly process of forming grow rack assembly 20. In particular, frame 70 is installed within bottom shelf 24 whereby the side wall 38 surrounds the lower portion of frame 70. As illustrated in FIGS. 5A and 5B, screws 86 and nuts 88 may be used to fixedly connect the frame members together.

As discussed above, the light system packaged in the plant growing assembly kit 18 includes the LED driver 52 and the set of light panels, described in more detail below. As can be seen in FIGS. 3 and 7, the LED driver 52 includes a metal housing 90 with a pair of pre-wired water-resistant rotary switches 92, an on/off switch 94, and three quick-connectors 96 for attachment of electric cables for LED lights. LED driver 52 additionally includes a pre-wired power cord with grounded 115V plug (not shown). The set of LED light panels, pre-packaged in the light panels box 54, are three separate ultra-thin, reinforced aluminum extruded light panels 98, such as shown in FIG. 9A, that are configured to interlock together to form a LED light fixture 100, such as shown in FIG. 9B. Each light panel 98 includes lights on the underside, such as arrays of LED lights, and approximately half an inch ventilation holes strategically located throughout each panel 98 to dissipate radiant heat from the LED lights. The upper side of each light panel 98 includes a corrugated surface acting as heat sinks for passive cooling. As shown in FIGS. 9A and 9B, each panel 98 further includes a pre-wired quick-connect water-resistant input cable 102 to electrically connect each panel 98 to a respective quick-connector 96 of the LED driver 52. Panels 98 are connected together, including via a pair of support brackets 72. The support brackets 72 include an angled flange that extends over all three panels 72, with each bracket 72 being secured to each of the three LED panels 98, such as by way of fasteners.

Figure 10:
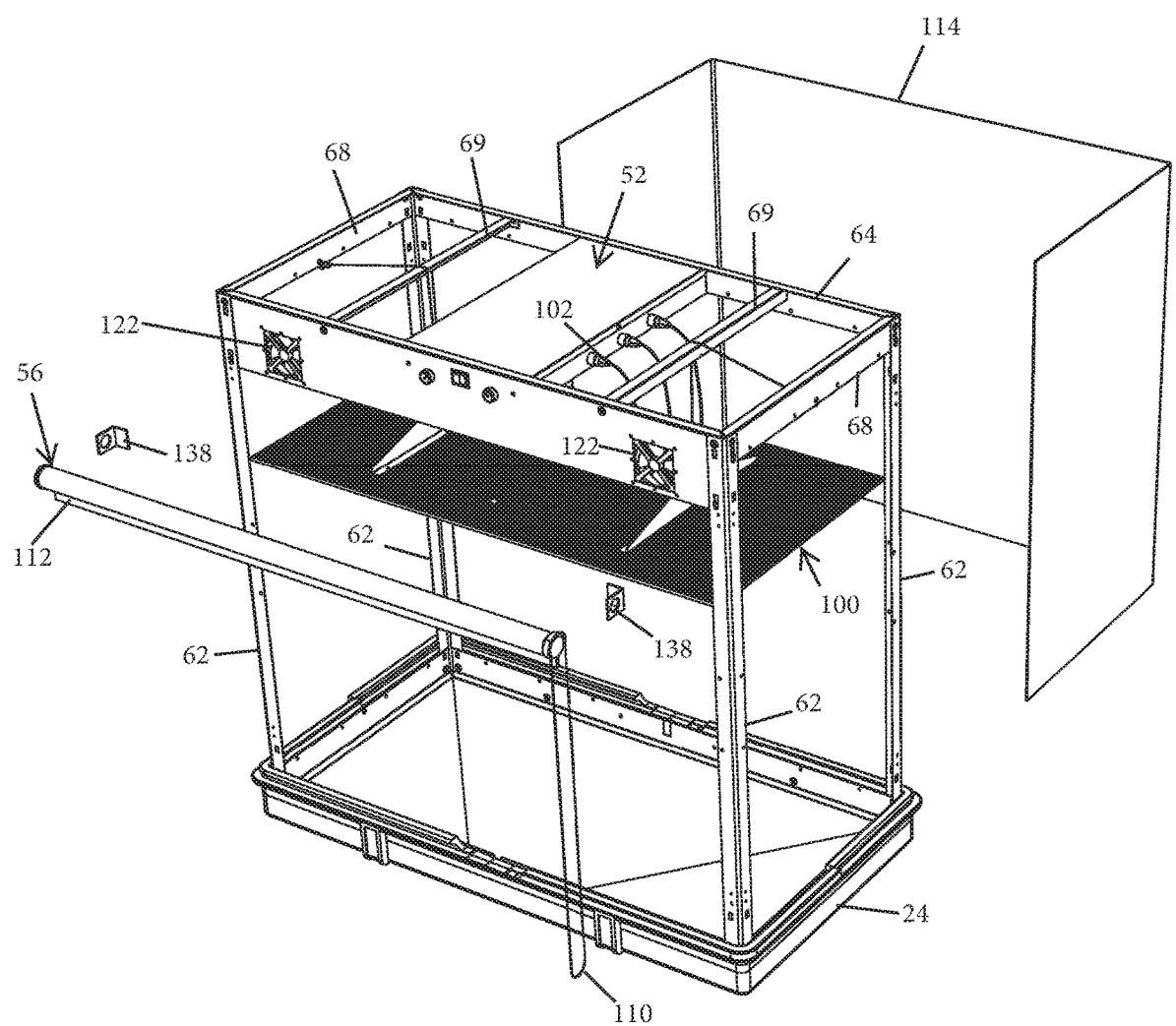
FIG. 10 is a perspective view of the frame assembly kit of FIG. 8 shown with the light system mounted thereto, and with a front reflective shade and a fixed reflective panel prior to installation.

As shown in FIG. 9B, adjustable cable or rope hangers 104 are secured to each of the support brackets 72, which, as understood from FIG. 10, enable the position of the LED light fixture 100 to be vertically adjustable when installed to frame 70. In the illustrated embodiment rope hangers 104 are fully adjustable and are tear and rust resistant, and are made from ⅛" diameter solid braided polypropylene rope. Each rope hanger 104 includes an internal zinc-plated steel gear with a push button 106, which provides the means for vertical adjustment, and a carabiner clip 108 on one end of each rope hanger 104, as shown in FIG. 9B, for attachment to respective side beams 68 of frame 70. As understood from FIG. 10, the rope hangers 104 extend over cross bars 69, with the respective ropes being slidably engaged within notches 84 for guiding and positioning the LED light fixture 100. It should be appreciated that the vertical position of the LED light fixture 100 may be adjusted based on the size or height of the plant being grown using growing assembly kit 18.

The LED light fixture 100, in cooperation with the LED driver 52, form a dimmable spectrum LED light system, when assembled. The light system is configured to establish consistent photosynthetic photon flux density (PPFD) values across the entire plant canopy area for enhanced plant growth. Additionally, the light system is configured to selectively apply different light spectrums during specific plant growth stages for the best growth of a variety of plants. An adjustable spectrum is created with two rotary switches 92 that allow the user to adjust the intensity of the red spectrum and white (blue) spectrum independently to provide more versatility for crops like lettuce that can be challenging to grow successfully indoors. For example, lettuce enjoys higher blue spectrum and less red spectrum during its grow cycle for fuller and denser heads, whereas tomatoes and cannabis prefer higher red spectrum with the blue spectrum during the vegetable phase and a great deal of red spectrum during the flower/fruiting phases.

The dimmable spectrum LED light system provides a number of benefits for successful indoor growing of a variety of plants. For example, the light system is configured to emit full spectrum lighting, which provides plants everything they desire from natural sunlight. The system is spectrum dimmable with Max. PPFD>700 umol/m2/s @ 2 ft above plant canopy using reflectors. The light system provides 80% energy savings as compared to traditional high-pressure sodium and metal halide lamps. The LED driver 52 is damp rated for wet locations. The light system is operable with wide voltage power supply AC100-240V, 50/60 Hz, PF>0.9. The light system has a wide range of working temperature; from −20° C. to 40° C., and relative humidity of 40% RH. The light system is also environmentally friendly, as it does not contain pollutants or harmful substances under ROHS. Additionally, the light system of the plant growing assembly kit 18 is operable to provide at least the following spectrums and wavelength: blue 400~470 nm, which promotes chlorophyll and carotenoid for photosynthesis and leaf production; red 610~720 nm, which promotes chlorophyll absorption for photosynthesis and photoperiodism; and IR 720~1000 nm, which promotes cell growth influences blooming and sprouting.

The front reflective shade 56, shown in FIG. 3 in a rolled-up configuration for packaging, includes a plastic pull chain 110 and weighted stabilizing bar 112 (FIG. 10). The front reflective shade 56 is adapted to selectively fully expand and retract into the rolled-up configuration via pull chain 110. The front reflective shade 56 is made of a relatively thick Mylar film that includes a highly durable diamond-textured surface on the interior side of the reflective shade 56. Only in the rolled-up configuration for packaging, the front reflective shade 56 additionally contains a fixed reflective panel 114, shown in an expanded configuration in FIG. 10, that is rolled over in the front reflective shade 56. The fixed reflective panel 114 is made of the same material as the front reflective panel 56 and also includes the highly durable diamond textured surface on the interior side of the fixed reflective panel 114.

The set of various accessories pre-packaged in the accessories box 58 includes the previously mentioned pair of rope hangers 104 (FIG. 9B), and additionally includes a plurality of grow bags 116 (FIG. 12), a timer (not shown), a thermometer/hygrometer (not shown), pH control kit (not shown), a soil tester (not shown), and a plug adapter (not shown). In the illustrated embodiment, the grow bags 116 are collapsible 3-gallon aeration fabric pots that are made from high-quality nonwoven fabric and include built-in handles 118. The grow bags 116 promote root expansion through better aeration, prevent a circling root structure, and are permeable allowing excess water to drain through the fabric and into the front-middle region 37 of the base pan 24. The grow bags 116 are durable and reusable for several growing seasons. The timer is a heavy-duty 7-day programmable plug-in unit to control the plant lighting cycle on a typically grounded 115V/15 Amp residential outlet. The timer includes a built-in battery backup, clear LCD digital display, automatic on/off function. The timer is also programmable for Daylight Savings, and is UL listed.

The supplied thermometer/hygrometer is an all-in-one pre-calibrated gauge for measuring internal temperature and humidity of the grow area. The thermometer/hygrometer includes an easy-to-read display that displays daily high and low temperature/humidity results, and a magnetic mount for attaching the thermometer/hygrometer to one of the vertical posts 38 in the grow area. The pH control kit provides for maximum plant growth by monitoring pH levels of the water and nutrient mixture given to the plants. The kit includes an 8 oz. jar of pH "up", an 8 oz. jar of pH "down", a test tube, a 1 oz. indicator, and a vial. The soil tester is a three-in-one meter designed to better understand plant condition by monitoring soil moisture, soil pH value, and light level. The tester includes a double-needle detection technology that enhances the speed and accuracy of analyzing soil moisture and pH levels. The tester does not need batteries. The plug adapter is a 3-wire outlet adapter that converts any standard indoor electrical outlet into a ground fault (GFCI) protected outlet. The adapter includes a bright "red" light indicator that indicates when the power is "ON". The tester also includes test and reset buttons that allow for periodic testing of the adapter. The adapter is compatible with 15-amp U-ground outlets and plugs, 2 or 3 wire, and includes a trip level of 4-6 mA and is UL and CUL listed.

The scrog screen 60 is a wire trellis, which is utilized to provide additional plant support and to control vertical growth during the flowering stage. It maintains evenness in the plant canopy by allowing the grower to gently bend the stems to force the plant to grow laterally and diminish light intensity. The wire trellis includes a 16-gauge vinyl-coated welded-wire steel mesh. As shown in FIG. 12, screen 60 may be retained in a desired orientation via a pair of trellis bungees 120 that are attachable into apertures in posts 62, where bungees 120 are also contained within kit 18.

The plant growing kit 18 further includes a pair fan assemblies 122, shown for example in FIG. 10. Each fan assembly 122 includes an interior granulated carbon filter sandwiched between a pair of safety grilles to remove unwanted odor from inside of the plant growing assembly 20. The plant growing kit 18 additionally includes a trimming scissors (not shown), a nutrient kit (not shown), and a hardware bag (not shown) that contains fasteners, including screws 86 and nuts 88 for attaching selective frame components together, as well as fasteners for attaching the light system to the frame assembly, and brackets and fasteners for attaching the fixed reflective panel 114 to the frame assembly 70, which will be described in more detail below.

According to the illustrated embodiment of FIG. 4, the frame assembly 70 of the plant growing assembly 20 is constructed by first connecting opposing ends of a pair of vertical posts 62 via a pair of side beams 68 to form a first side 124 of the frame assembly. As best shown in FIGS. 5A and 5B, the pair of vertical posts 62 are connected by respective tapered slots 76 of each vertical post 62 receiving and securely engaging with respective tabs 80 of each respective side beam 68. A screw 86 with locknut 88 are used to secure/reinforce the connection. A second side 126 of the frame assembly 70 is constructed in the same manner as described above. The three face beams 64 and the front fan mount 66 are then used to interconnect upper and lower ends of the first and second sides 124, 126 to form the frame assembly 70. The first and second sides 124, 126 are interconnected in the same manner as described above, i.e. by engaging respective tapered slots 76 of each vertical post 62 with respective tabs 80 of each respective face beam 64 and front fan mount 66, and securing the connection with a screw 86 and locknut 88. It will be understood that the front fan mount 66 is used to interconnect the upper ends of the first and second sides 124, 126, with the significantly wider flange of the front fan mount 66 serving as a front side or front face of the frame assembly 70 and of the plant growing assembly 20.

Figure 6:
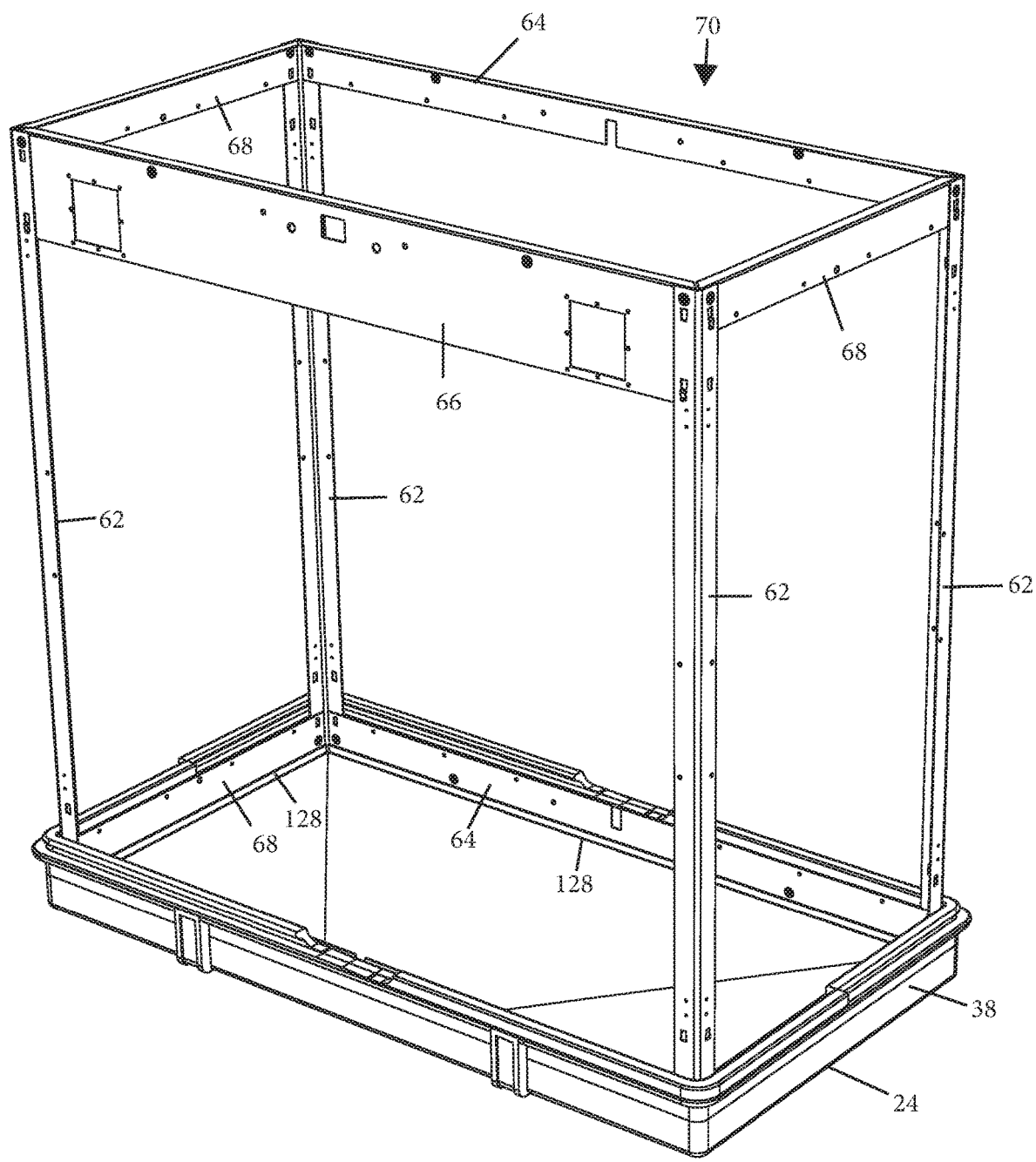
FIG. 6 is a perspective view of the frame assembly shown installed to the bottom shelf.
Figure 8:
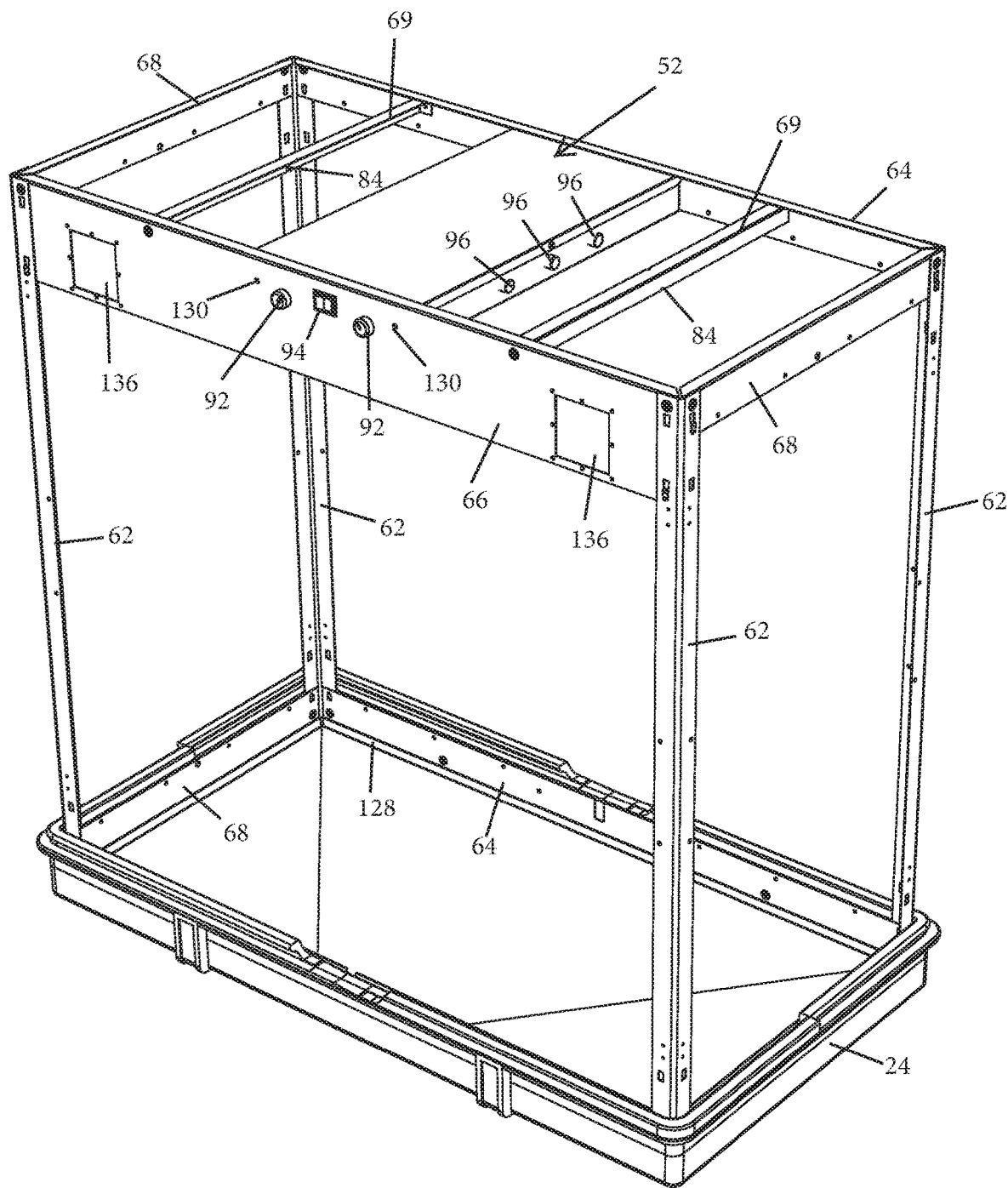
FIG. 8 is a perspective view of the frame assembly of FIG. 7 shown with the upper cross bars and LED driver mounted to the frame assembly.

Turning now to FIG. 6, the frame assembly is then placed into the interior surface of the base shelf 24, with lower face beams 64 and side beams 68 sitting flush on a raised edge 128 disposed around a perimeter of the interior surface of the base shelf 24. With reference to FIGS. 7 and 8, the two upper cross bars 69 are mounted between the upper face beam 64 and the front fan mount 66. A screw 86 and locknut 88 are used to secure each end flange 82 of each upper cross bar 69 to respective upper face beam 64 and front fan mount 66. The LED driver 52 is then also mounted between the upper face beam 64 and the front fan mount 66 by using four truss head machine screws, with a pair of the screws 130 inserted through the front fan mount 66 (FIG. 8) and another pair of the screws (not shown) inserted through the upper face beam 64. The pair of rotary switches 92 and the on/off switch 94 of the LED driver assembly 52 are fitted into respective apertures 132 and 134 of the front fan mount 66 (FIG. 7).

Turning now to FIGS. 9A and 9B, the LED light fixture 100 is formed by nestling light panels 98 together with a tongue and groove joint and further securing the connection by the two support brackets 72 that are each coupled to each light panel 98. In the illustrated embodiment of FIG. 9B, the smaller flange of each support bracket 72 is coupled to each light panel 98 by three stainless-thin hex head screws and wing nuts. An end of the rope hanger 104, that is opposite the end with the carabiner clip 108, is then attached to each support bracket 72 through the hole in the larger flange of each support bracket 72. As best shown in FIG. 10, the LED light fixture 100 can then be maneuvered into the frame assembly 70 by each of the pair of rope hangers 104 extending over respective upper cross bars 69 and attaching with the carabiner clip 108 to respective center holes in the opposing upper side beams 68. It will be understood that the notch 84 on each upper cross bar 69 serves as an indicator and retaining groove for the placement of each rope hangers 104. It should also be appreciated that once the LED fixture 100 is installed in the frame assembly 70, the LED fixture 100 can be vertically adjusted, i.e. raised or lowered, by pressing the push button 106 of each of the rope hangers 104. The installation of the light system is completed by plugging cables 102 of the LED light fixture 100 into respective connectors 96 of the LED driver 52.

With continued reference to FIG. 10, the pair of fan assemblies 122 are mounted into respective apertures 136 in the front fan mount 66 (FIG. 8). The pair of fan assemblies 122 with carbonated filters are designed to pull ambient room air through the front bottom of the plant growing assembly 20, up through the plant canopy, through the LED light fixture 100, up into the top portion of the plant growing assembly 20, and out the front face of the front fan mount 66 through the carbonated filters. This provides the needed airflow for superior plant growth and to aid in the reduction of odors that may form inside the plant growing assembly 20 filled with plants. Each fan assembly 122 features an airflow of 110 CFM, 2600 RPM, and a noise level of 47 dBA. Each fan assembly 122 is fastened to the exterior face of the front fan mount 66 and includes a 120V cord that plugs into an outlet on the LED driver 52.

The fixed reflective panel 114 is secured to the sides and back of the frame assembly 70, such as shown in FIG. 10, using push rivets and Velcro provided in the hardware bag of the plant growing kit 18. It will be understood that the reflective surface of the fixed reflective panel 114 is faced inward. The front reflective shade 56 is then mounted by first attaching corner brackets 138 to the vertical posts 62 at the front side of the frame assembly 70, and then mounting the front reflective shade 56 into the brackets 138 (FIG. 11), as spring-loaded ends of the front reflective shade 56 are adapted to clip into the corner brackets 138. The front reflective shade 56 is designed as a roll-up window shade providing ease of access during plant maintenance. It will be understood that the reflective surface of the front reflective shade 56 is faced inward. The top cap 26 is then fitted over the top of the frame assembly 70, as shown in FIG. 11. It will be appreciated that top cap 26 may now be turned into a useable top shelf or ergonomic work surface for typical horticultural or other needs.

With reference to FIG. 12, unfolded grow bags 116 may now be placed onto the interior surface of the base shelf 24. The pair of trellis bungees 120 may now be attached. In the illustrated embodiment, the end hooks of each bungee 120 attach through pre-punched holes in diagonally positioned vertical posts 62 such that the pair of trellis bungees 120 form an "X" pattern. The trellis bungees 120 are used to provide support for the scrog screen 60, which is placed over the trellis bungees 120. It will be appreciated that the bungees 120 may be attached to form a different pattern and that the screen 60 is vertically repositionable as the trellis bungees 120 may be attached to other holes along the height of the posts 62.

In the illustrated embodiment, the frame assembly 70 is approximately four feet high by four feet wide and two feet deep, with the bottom shelf 24 and top cap 26 dimensioned accordingly. It should be appreciated, however, that alternative sizes and configurations may be employed.

The present invention thus provides a plant growing rack assembly system that is collapsible into a convenient orientation for transport and sale with no shipping waste, and when assembled is useable and adjustable to suit different planting requirements for growing a variety of plants, including decorative flowering plants, fruits, vegetables and other plants, including legalized growing of cannabis. The provided kit thus provides a pre-engineered, all-in-one horticultural grow product for growing plants that includes everything, less the seedlings and soil/dirt, to grow plants indoors. It is an all-in-one solution eliminating the need for the consumer to spend hours researching equipment options.

In the illustrated embodiments, the plant growing assembly 80 has a generally rectangular configuration, including the shelves and frame when assembled. It should be appreciated that alternative configurations may be employed within the scope of the present invention. Still further, the illustrated frame may also be alternatively configured, including having more or fewer frame members, and altered orientations for such supports and manner of interconnection thereof. Accordingly, changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A horticultural plant growing assembly, said assembly comprising:
 a pair of casings, with each said casing comprising a bottom and a side wall defining a perimeter of said casing, wherein each said side wall includes an upper edge;
 a light system, said light system comprising lights for projecting light; and
 a plurality of frame members, said frame members being connectable together to form a frame, wherein said light system is selectively attachable to said frame;
 wherein said plant growing assembly is selectively configurable into a packaged configuration and an assembled configuration, wherein in said packaged configuration said upper edges of said casings are configured to be engaged together to define a cavity between said bottoms of said casings with said frame members and said light system contained within said cavity, and wherein in said assembled configuration said frame members are connected together to form said frame with said light system attached to said frame, and with said frame engaged with and extending upward from one of said casings whereby said one of said casings comprises a bottom member of said plant growing assembly in said assembled configuration, and wherein said lights of said light system are oriented to project downwardly toward said bottom member.

2. The plant growing assembly of claim 1, wherein said bottom member comprises a shelf configured to support a plant with said light system being disposed above said shelf.

3. The plant growing assembly of claim 2, wherein said bottom of said bottom member is downwardly sloped to direct water accumulated on said shelf to a designated region.

4. The plant growing assembly of claim 1, wherein in said assembled configuration the other of said casings is engaged with said frame opposite from said bottom member.

5. The plant growing assembly of claim 1, wherein said lights are adjustably mounted to said frame whereby the vertical height of said lights relative to said bottom member is adjustable.

6. The plant growing assembly of claim 5, wherein said light system comprises a light driver and said lights comprise a light fixture with said light fixture connectable to said light driver to receive electrical power therefrom, and wherein said light driver and said light fixture are configured to be selectively attachable to said frame, and wherein said light driver assembly and said light fixture are contained within said cavity in said packaged configuration.

7. The plant growing assembly of claim 6, wherein said light fixture comprises a plurality of light panels configured to be assembled together to form said light fixture.

8. The plant growing assembly of claim 6, wherein said light driver includes switches and is operable to adjust the light output of the light fixture.

9. The plant growing assembly of claim 8, wherein said light driver is operable to selectively adjust the intensity of different spectrums of light.

10. The plant growing assembly of claim 1, further comprising a wrapper disposed about an exterior of said casings when in said packaged configuration, wherein said wrapper includes a handle and is removable from said casings.

11. The plant growing assembly of claim 1, further comprising at least one fan that is selectively attachable to said frame, and wherein said fan is contained within said cavity in said packaged configuration.

12. The plant growing assembly of claim 11, wherein said frame members comprise a front face mount that when assembled into said frame is disposed at an upper location of said frame opposite said bottom member, and wherein said front face mount includes at least one aperture for receiving said fan.

13. The plant growing assembly of claim 11, wherein said light system includes a light driver, and wherein said light driver is mounted to said frame in said assembled configuration, and wherein said fan is connectable to said light driver to receive electrical power therefrom.

14. The plant growing assembly of claim 1, wherein said plurality of frame members are elongate angled members and wherein said frame members comprise horizontal frame members and vertical frame members, and wherein when said frame members are connected to form said frame said horizontal frame members are oriented horizontally and said vertical frame members are oriented vertically.

15. The plant growing assembly of claim 1, further comprising a reflective panel selectively attachable to said frame, wherein said reflective panel is configured to wrap around a pair of side sections and a back section of said frame, and wherein said reflective panel is contained within said cavity in said packaged configuration.

16. The plant growing assembly of claim 1, further comprising a retractable reflective shade selectively attachable to said frame, wherein said retractable reflective shade is configured to selectively cover a front section of said frame and is configured to selectively expand and retract to provide access to said bottom member, and wherein said retractable reflective shade is contained within said cavity in said packaged configuration.

17. The plant growing assembly of claim 1, further comprising a plurality of growing containers, wherein said growing containers are disposed within said cavity in said packaged configuration and are configured to be disposed on said bottom member when in said assembled configuration.

18. The plant growing assembly of claim 1, wherein said frame members comprise a plurality of posts and wherein said posts are vertically oriented when assembled into said frame, and further comprising a screen that is contained within said cavity in said packaged configuration and is selectively mountable to said posts in said assembled configuration so as to be positioned vertically above said bottom member.

19. A horticultural plant growing assembly, said assembly comprising:
 a pair of casings, with each said casing comprising a bottom and a side wall defining a perimeter of said casing, wherein each said side wall includes an upper edge;
 a light system, said light system comprising lights for projecting light; and
 a plurality of frame members, said frame members being connectable together to form a frame, wherein said light system is selectively attachable to said frame;
 wherein said plant growing assembly is selectively configurable into a packaged configuration and an assembled configuration, wherein in said packaged configuration said upper edges of said casings are configured to be engaged together to define a cavity between said bottoms of said casings with said frame members and said light system contained within said cavity, and wherein in said assembled configuration said frame members are connected together to form said frame with said light system attached to said frame, and with said frame engaged with and extending upward from one of said casings whereby said one of said casings comprises a bottom member of said plant growing assembly in said assembled configuration, and wherein said lights of said light system are oriented to project downwardly toward said bottom member; and wherein in said assembled configuration the other of said casings is engaged with said frame opposite from said bottom member; and wherein said lights are adjustably mounted to said frame whereby the vertical height of said lights relative to said bottom member is adjustable.

20. The plant growing assembly of claim 19, wherein said light system comprises a light driver and said lights comprise a light fixture with said light fixture connectable to said light driver to receive electrical power therefrom, and wherein said light driver and said light fixture are configured to be selectively attachable to said frame, and wherein said light driver and said light fixture are contained within said cavity in said packaged configuration, and wherein said light driver includes switches and is operable to adjust the light output of the light fixture.

* * * * *